United States Patent Office 2,738,820
Patented Mar. 20, 1956

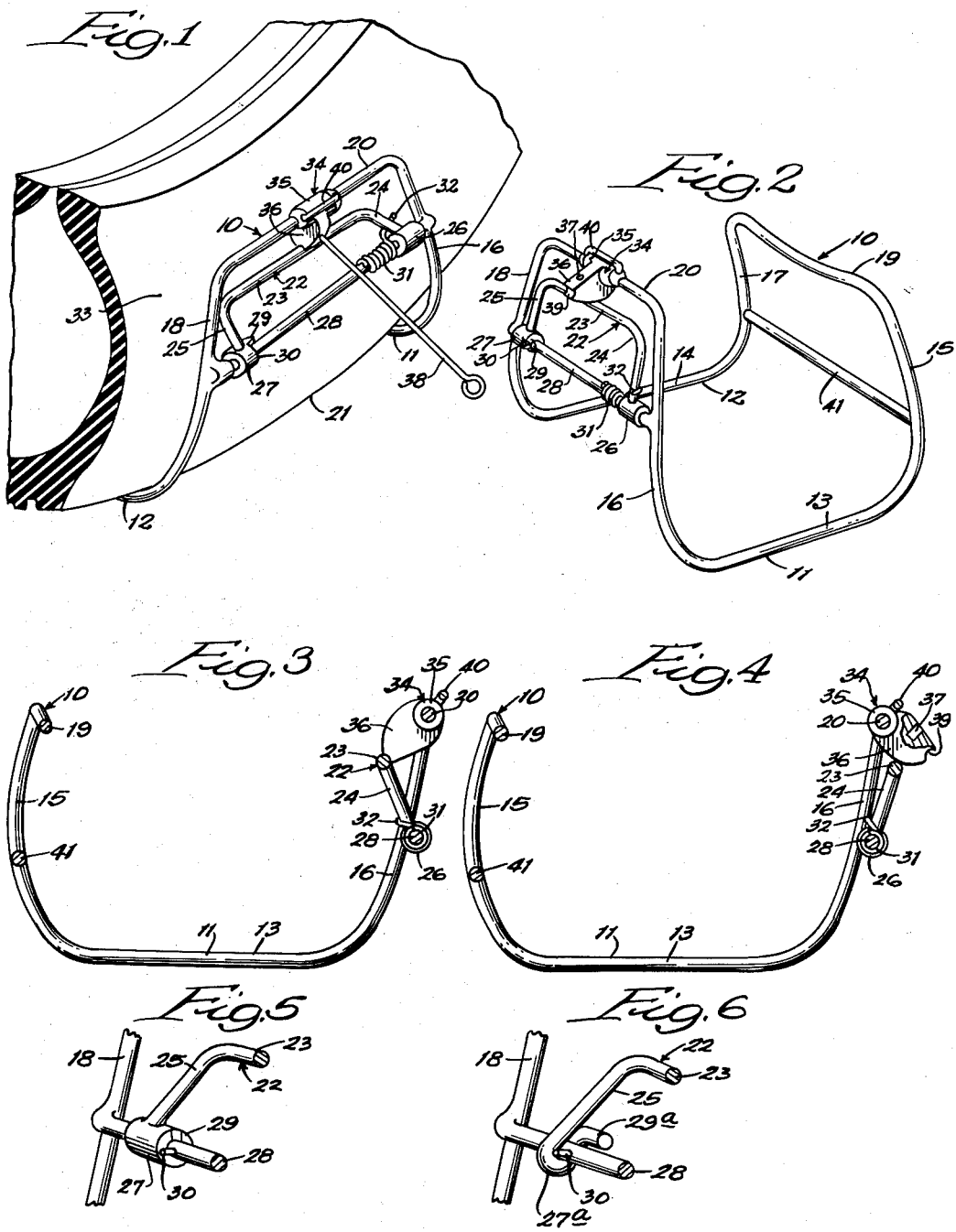

2,738,820
TRACTION DEVICE FOR VEHICLES

John W. Browning, Streator, Ill., and James C. Roberts, Great Falls, Mont.

Application July 5, 1952, Serial No. 297,368

11 Claims. (Cl. 152—225)

This invention relates to a traction device for vehicles, and more particularly to a traction device that may be removably secured to the tire of a vehicle wheel.

In the past, various types of traction devices have been used for attachment to the tires of vehicles. Chain type traction devices are common, but these are difficult to place on the tire and secure thereto and are usually designed for semipermanent use. Also used are individual traction units or devices that the secured in place upon the tire of a wheel by threading a fastening member through the spokes of the wheel or by other means in which the device is secured to the rim. Sometimes these units are used in pairs or sets and the fastening devices employed interconnect the separate units. Traction devices of this character are also difficult to secure in place upon the tire, and in addition, it is common for these units to creep along the periphery of the tire and since the fastening means is secured to the rim it remains stationary and the traction member lying across the tread is drawn inwardly. When the traction member is drawn inwardly the tire is thereby distorted and the tread as well as the side wall, etc., may be damaged. Further, the traction member is drawn inwardly of the normal tire periphery and no longer functions to grip the road, etc.

Traction units are also known that are equipped with devices that may be quickly and easily moved to frictionally engage the side walls of the tire and thereby retain the traction device in position. Though these devices are easily mounted upon the tire, they are prone to be twisted and dislodged from place by the rotation of the wheel and tire.

It is, then, an object of this invention to provide a traction device that may be releasably mounted upon the tire-equipped wheel of a vehicle and that will overcome the above-mentioned obstacles. Another object of the invention is to provide a traction device that may be quickly and easily mounted on the tire-equipped wheel of a vehicle and also removed therefrom in a minimum of time and operations. Still another object of the invention is to provide a traction device that securely grips the tire and thereby minimizes the tendency to creep. A still further object is to provide a traction device that may be quickly and easily mounted upon and removed from the tire of a vehicle and that will not be twisted and dislodged from the tire even when subjected to hard pulls. Yet a further object is to provide a traction device having a pair of spaced-apart traction members extending transversely of the tire tread and having interconnected portions; the spaced traction members cooperating to prevent twisting of the device and dislodgement from the tire. Other objects and advantages will appear as the specification proceeds.

An embodiment of our invention is illustrated in the accompanying drawings, in which—

Figure 1 is a perspective view of our traction device shown mounted upon a tire; Fig. 2, a perspective view of the traction device, the tire gripping member being shown in released position; Fig. 3, a sectional view taken from a point inwardly of the U-shaped member that is shown in forward position in Fig. 1; Fig. 4, a view similar to that of Fig. 3, but showing the gripping member in released position; and Fig. 5, an enlarged fragmentary view of the gripping member stop arrangement; and Fig. 6 is a perspective view of a modified gripping member.

Our traction device 10 comprises a pair of U-shaped members 11 and 12 providing traction members or transverse rods 13 and 14 formed integrally with spaced-apart legs 15, 16, 17 and 18 adapted to straddle a tire. Longitudinal connectors or side wall rods 19 and 20 are formed integrally with the legs. The legs 15 and 17 are arcuate and conform generally to the contour of a tire side wall. The legs 16 and 18, on the other hand, are substantially straight and extend outwardly, and the longitudinal connector 20 is therefore held in spaced relation with the side wall of a tire.

In order to lock or secure the traction device upon a tire 21, a generally U-shaped locking or gripping member 22 having a friction bar 23 extending in a generally parallel relation with the longitudinal connector 20 and integral arms 24 and 25 is pivotally mounted upon the spaced legs 16 and 18. For this purpose the ends of the arms 24 and 25 are equipped respectively with collars 26 and 27 adapted to receive an axle or pivot rod 28 extending in generally parallel relation with the longitudinal connector 20 and secured to the spaced legs 16 and 18. Any suitable means may be employed for mounting the pivot rod 28 upon the legs 16 and 18, and we have found that brazing or welding is satisfactory for this purpose. The collar 27 is undercut along its inner edge to provide a shoulder 29 that cooperates with a pin 30 secured to the axle or pivot rod 28 to provide a stop or limit for the gripping member 22. A helical spring 31 is mounted upon the pivot rod 28 adjacent the collar 26 and is equipped with a hooked end 32 that receives the arm 24. The spring 31 is tensioned to hold the locking or gripping member 22 in an outward position so that the traction device may readily be placed upon the tire 21. The shoulder 29 and pin 30 limit the outward movement of the gripping member 22 and with the spring 31 normally hold the gripping member 22 in the position illustrated in Figs. 2 and 4.

The locking or gripping member 22 is moved into and held in resilient frictional engagement with the side wall 33 of the tire 21 by a locking clamp 34 providing a collar 35 pivotally mounted upon the connector bar 20 and having a laterally-extending ear 36 formed integrally therewith. The ear 36 is provided with a hole or small bore 37 adapted to receive an actuating key or pin 38. The key 38 forms a lever with which the clamp 34 may be moved to lock the gripping member 22 in frictional engagement with the side wall 33 of a tire. The ear 36 is also equipped at its outer end with an arcuate groove or channel 39 that conforms to the contour of the friction rod 23 which is received within the arcuate groove 39 when the gripping member 22 is moved into locking engagement with the tire. If desired, the lower edge of the ear 36 may be slightly arcuate to permit the friction rod 23 to ride smoothly over it when the clamp 34 is moved downwardly to lock the gripping member in engagement with the tire. If desired, a shoulder or detent or, as illustrated, a stop clip or bar 40, may be employed to provide a stop for the locking clamp 34 to prevent it from turning completely about the connector rod 20 and reversing its position, while engagement with the friction bar 23 normally holds it in the outwardly-extending position illustrated in Figs. 2 and 4. This arrangement facilitates mounting the traction device upon a tire. If desired, a reinforcing bar 41 may be provided, but this has not been found necessary.

Any suitable material may be used to form our traction device, and we have found that a spring steel provides a suitable material. The traction members 13 and 14 may be cylindrical in cross section or may have any other desired shape. For example, the members 13 and 14 may be flattened to provide straps that are generally rectangular in cross section. The surface portion of the members 13 and 14 engaging the road bed may be embellished with projections, etc., to increase the gripping action, if this is thought desirable, and it is contemplated that traction members may be removably secured to the rods 13 and 14 to prevent wearing of these rod members. The straddle legs and transverse connectors need not be cylindrical in cross section as illustrated, but may have any other convenient cross-sectional shape. The same is true of the gripping member 22 and axle 28.

Our traction device may be formed in many different ways, but we have found it particularly desirable to bend a length of spring wire or rod to form either the spaced U-shaped member 11 or 12, then form the connector 19 integrally therewith, bend the rod or wire to form the other U-shaped member 11 or 12 integrally with the connector 19, and finally bending the wire to form the connector 20. If desired, the ends of the rod or wire may be made to join adjacent the point at which the axle 28 is secured to the U-shaped members. However, this is not essential and the joint may be formed at any suitable position, but we prefer to have the joint spaced from the traction members 13 and 14. The locking clamp 34 may then be threaded upon the connector 20, and this may be done prior to making the last bend in the wire, so as to facilitate moving the clamp 34 into proper position.

The gripping member 22 may be formed from the same material, and after the wire or rod is bent into the generally U-shape illustrated and the collars 26 and 27 secured to the arms 24 and 25 by welding or brazing, etc., the collars are threaded onto the axle 28 and the axle is then secured to the legs 16 and 18 by welding, etc.

In the modification illustrated in Fig. 6, the end of the arms 24 and 25 is bent to form eyes such as that shown at 27a. The end of the rod is turned laterally from the eye 27a to provide a shoulder 29a adapted to engage the pin 30. Equipping the end of the arms 24 and 25 with eyes or loops eliminates the need for separately formed collars 26 and 27. In either case, however, the collars or the eyes function in the same manner and provide a pivotal mounting for the gripping member 22.

*Operation*

In operation, the traction device is quickly and easily mounted upon a tire by placing the legs 15, 16, 17 and 18 and the connectors 19 and 20 into position straddling the tire 21. The locking or gripping member 22 is held outwardly by the action of the spring 31 and the limit provided by the shoulder 29 and pin 30 and therefore offers no interference while the traction device is being placed upon the tire. The locking clamp 34 pivots freely upon the connector 20, or if a stop arrangement is provided the clamp is held outwardly from the tire side wall and offers no obstruction to the proper mounting of the traction device. After the traction device is in position and the traction members 13 and 14 are in abutting relation with the thread or periphery of the tire, the key or pin 38 is inserted into the bore 37 with which the locking clamp is provided and the locking clamp is then moved downwardly until the arcuate under surface engages the friction bar or rod 23 of the U-shaped gripping member 22. Continued downward and inward movement of the locking clamp 34 pivots the gripping member 22 inwardly through an arcuate path and eventually downwardly and into engagement with the side wall 33 of the tire. The locking clamp 34 is pivoted until the friction rod 23 snaps into place within the arcuate groove 39 at the end of the ear 36, as shown in Figs. 1 and 3. The resilient engagement with the side wall of the tire locks the member 22 and the clamp 34 in this position and the traction device is securely mounted upon the tire. The traction device is just as easily removed from the tire, and to accomplish the removal the pin or key 38 is placed within the bore 37 and a slight upward force is exerted against the key. The arcuate groove 39 snaps free of the friction rod 23 and the traction device is free to be taken from the tire.

It will be noted that the longitudinal connector 20 is spaced outwardly from the side wall of the tire and the locking clamp 34 is therefore free to pivot upon the connector. Most modern cars are provided with wheel skirts that may be attached to the fender or else the fender is formed with an integral skirt. The spacing between the skirt and tire is usually quite small, and connector 20 should be positioned as closely to the side wall of the tire as possible to avoid interfering with the skirt.

We have provided a traction device that may be simply and quickly formed and that is very inexpensive. The device is mounted upon and removed from the tire of a wheel in a minimum of time with nothing more being involved than a simple snap action of the locking clamp 34. A slight downward pressure is exerted by the fingers and wrist to snap the clamp in locking engagement with the gripping member 22. Likewise, a simple snap action of the wrist releases the gripping member from resilient engagement with the tire and the traction device may then be removed.

Creeping of the traction device is minimized in that the legs 16 and 18 and the traction members 13 and 14 as well as the rod 23 frictionally engage the tire when the traction device is mounted thereon. Moreover, when the traction device is resting upon the road bed, the weight of the car distorts the tire and it is forced into greater frictional engagement with the members mentioned above. Therefore, at the very moment when the forces tending to make the traction device creep are greatest, the frictional engagement tending to counteract the creeping forces are also the greatest. Further, the traction members 13 and 14 cooperate to prevent the traction device from being twisted from position upon the tire and there is no danger of the traction device being dislodged.

While in the foregoing specification we have set forth in considerable detail a specific embodiment of our invention for purposes of illustration, it is understood that the details of our invention may be varied widely by those skilled in the art without departing from the spirit and scope of the invention.

We claim:

1. A traction device adapted for mounting upon the tire of a vehicle, comprising a pair of spaced-apart traction members equipped with legs adapted to straddle a tire, connector members extending between the legs of opposite traction members and securing the same together, a generally U-shaped gripping member interposed between the legs of opposite traction members on the same side of the tire and being pivotally carried by said legs, and a locking clamp pivotally mounted upon the connector adjacent the U-shaped gripping member and adapted to engage said gripping member with progressively increasing force for releasably locking the same in engagement with the side wall of the tire at a spaced distance from and out of contact with a rim upon which the tire is mounted.

2. In a traction device adapted for mounting upon a tire-equipped wheel of a vehicle, a pair of U-shaped members, each providing a traction member and a pair of spaced legs adapted to straddle a tire, a pair of connector members interposed between said U-shaped members and being formed integrally with the ends of said legs, an axle extending between a pair of said legs in generally parallel relation with the connector member formed integrally therewith, a generally U-shaped gripping member pivotally mounted upon said axle and adapted to pivot into frictional engagement with the side wall of the tire, and a clamp pivotally mounted upon the connector member adjacent said axle, said clamp being equipped with an ear adapted to engage said U-shaped gripping member to releasably lock same in frictional engagement with the side wall of the tire.

3. The structure of claim 2 in which a spring mounted upon said axle engages said U-shaped member and normally urges it outwardly and away from the side wall of a tire.

4. The structure of claim 2 in which the ear of said clamp is provided with a bore adapted to receive an actuating key.

5. The structure of claim 2 in which said ear is provided at its outer end with an arcuate groove adapted to receive said gripping member for locking it in engagement with the side wall of a tire.

6. In a traction device adapted to be releasably mounted upon the tire-equipped wheel of a vehicle, a pair of spaced-apart generally U-shaped members, each providing a traction member and spread legs formed integrally therewith, connector members extending between said U-shaped members and being formed integrally with the ends of said legs, said legs and connectors being adapted to straddle a tire and a leg of each U-shaped member being arcuate in shape to conform generally with the contour of the tire while the other legs extend outwardly so that the integral connector member is spaced from the side wall of the tire, an axle mounted upon said outwardly-extending legs, a pair of collars pivotally mounted upon said axle adjacent each end thereof, a U-shaped gripping member secured to said collars, and a locking clamp pivotally mounted upon the connector adjacent said axle and adapted to engage said gripping member to releasably lock the same in frictional engagement with the side wall of the tire.

7. In a traction device adapted for mounting upon a tire-equipped wheel of a vehicle, a pair of U-shaped members, each providing a traction member and a pair of spaced legs adapted to straddle a tire, connector members interposed between said U-shaped members and being secured to the ends of said legs, a pivotally mounted generally U-shaped gripping member interposed between said U-shaped members and being adapted to pivot into frictional engagement with the side wall of a tire, and a clamp carried by said device and being operatively arranged with said gripping member, said clamp being equipped with an ear adapted to engage said gripping member to urge the same into and releasably lock the same in frictional engagement with the side wall of a tire.

8. In a traction device adapted to be mounted upon and secured to the tire of a vehicle wheel, a pair of spaced-apart, generally U-shaped members each having spaced apart legs for straddling a tire and a traction member extending therebetween, connector members connecting said U-shaped members adjacent the open mouths thereof, an axle extending between said U-shaped members on one side thereof and being in spaced relation with the connector member on that side, a pivotal gripping member swingable into frictional engagement with the side wall of a tire upon which said traction device is mounted and a pivotal clamp member operatively arranged with said gripping member for releasably locking the same in frictional engagement with a tire side wall, one of those members being pivotally carried by the connector member and the other by said axle.

9. The device of claim 8 in which the spaced apart legs of said U-shaped members on one side thereof are generally arcuate to conform to the side wall of a tire and on the side thereof having said axle diverge outwardly.

10. A unitary traction device mountable upon a vehicle tire and being securable thereto, comprising a pair of spaced-apart generally U-shaped members each having spaced apart legs for straddling a tire and a traction member extending therebetween, a connector members connecting said U-shaped members adjacent the open mouths thereof, a gripping member interposed between the legs of said U-shaped members on one side thereof and being swingable inwardly into frictional engagement with the side wall of a tire upon which said device is mounted, and a clamp member interposed between the legs of said U-shaped members on the same side thereof having the gripping member and being supported for pivotal movement for engagement with said gripping member to swing the same inwardly, said clamp member having a cam surface engageable with said gripping member to force the same into tight frictional engagement with a tire side wall and lock means for releasably locking said gripping member in such position.

11. The device of claim 10 in which the spaced apart legs of said U-shaped members on one side thereof are generally arcuate and on the side thereof having said gripping member and clamp diverge outwardly.

References Cited in the file of this patent

UNITED STATES PATENTS

| | | |
|---|---|---|
| 1,543,644 | Hadley | June 23, 1925 |
| 2,290,398 | Wellington | July 21, 1942 |
| 2,447,357 | Mosley | Aug. 17, 1948 |
| 2,467,659 | Boje | Apr. 19, 1949 |
| 2,625,193 | LaRocca | Jan. 13, 1953 |